April 24, 1956  J. B. CAROLUS ET AL  2,743,097
GENERATOR LOADING RATE CONTROL
Filed Aug. 25, 1953
5 Sheets-Sheet 1

April 24, 1956   J. B. CAROLUS ET AL   2,743,097
GENERATOR LOADING RATE CONTROL
Filed Aug. 25, 1953   5 Sheets-Sheet 5

Fig.7

United States Patent Office 2,743,097
Patented Apr. 24, 1956

2,743,097
GENERATOR LOADING RATE CONTROL

James B. Carolus, Elkins Park, and Edward J. Cranch, Bryn Athyn, Pa., assignors to Leeds and Northrup Company, Philadelphia, Pa., a corporation of Pennsylvania Application August 25, 1953, Serial No. 376,510

15 Claims. (Cl. 264—8)

This invention relates to load control systems for prime movers and has for an object the provision of means for establishing a load-regulation band having predetermined load limits between which the output or load on the prime mover may be varied without limitation as to rate, and when the load is outside of said band, there is imposed upon the prime mover a limitation as to its rate of change of output or load.

There are many prime movers subject to damage upon occurrence of large changes of output or of load at high rate. For example, the permissible rate of change on a steam turbine is limited by a number of factors including the uneven change in temperature of the various parts of the turbine if there be maintained thereon a load change at high rate. Such differences in temperature produce different rates of expansion and contraction of the various parts, and these in turn give rise to damage which may sometimes reach major proportions. Though it is possible to limit the average rate of change of load on the prime mover by restricting the rate of change of the control action due to a regulating governor, the permissible average rate would be unsatisfactorily low, and much lower than at times may be used in accordance with the present invention.

In accordance with the present invention, prime movers, such as steam turbines, may be controlled without limit as to rate to meet load changes within a regulation band of predetermined width, between the upper and lower limits of which expansion and contraction will not be sufficient to produce damage to the turbine.

Where prime movers are utilized to drive electrical generating units, the control system as a whole may be quite complex. The generating units may themselves form components of interconnected distribution networks. Individual generating units may be called upon not only to meet the changing load within a local area, but also to supply a part of the load which may be imposed upon more remotely located areas served by the interconnected networks.

In the control of electrical generating units, the trend has been to establish a base load for each generating station (which may include a number of generating units), such stations to retain adequate flexibility of control to meet fluctuating loads frequently referred to as of a fringe nature, that is to say, changes in load such as may result from a billet of steel entering and leaving a rolling mill. Thus it will be seen that each prime mover will be subjected not only to sustained load changes, but to fringe loads, the magnitude of which may greatly exceed the permissible limits of load changes for individual prime movers.

In accordance with the present invention, load changes of large magnitude will be met by the several prime movers and without injury to any one of them, since the load controller for each can function to change the load from one limit of the control band to the other without restriction as to rate, but upon attainment of an output corresponding with a load at one limit of the band the rate on that particular prime mover will thereafter be limited in that direction to the safe permissible rate. While it is so limited, other prime movers will be increasing their respective loads to the limits of their respective regulation bands. Concurrently, all prime movers will be then increasing their loads at safe permissible rates to meet sustained load demands imposed upon the particular generating station.

Further in accordance with the invention, two reference voltages differing by amounts corresponding with the width of the load-regulation band are varied with change in output or of load on the prime mover at rates not greater than the safe permissible rates of load change which may be maintained without damage to the prime mover over long periods of time. A comparison voltage is varied in accordance with change of output or of load on the prime mover. So long as the magnitude of the comparison voltage lies between the two reference voltages, the load on the prime mover may be varied by a load controller without limit as to rate. Whenever the comparison voltage attains a value equal to one of the reference voltages, the load change which may be produced on the prime mover by the load controller is then limited to said safe permissible rate. In this manner maximum flexibility is achieved in the operation of the prime mover to meet widely differing load demands.

Systems of various kinds and character may be utilized in carrying out the invention, and these together with other and further objects of the invention will be fully set forth in the following description, taken in conjunction with the accompanying drawings, in which.

Figure 1:
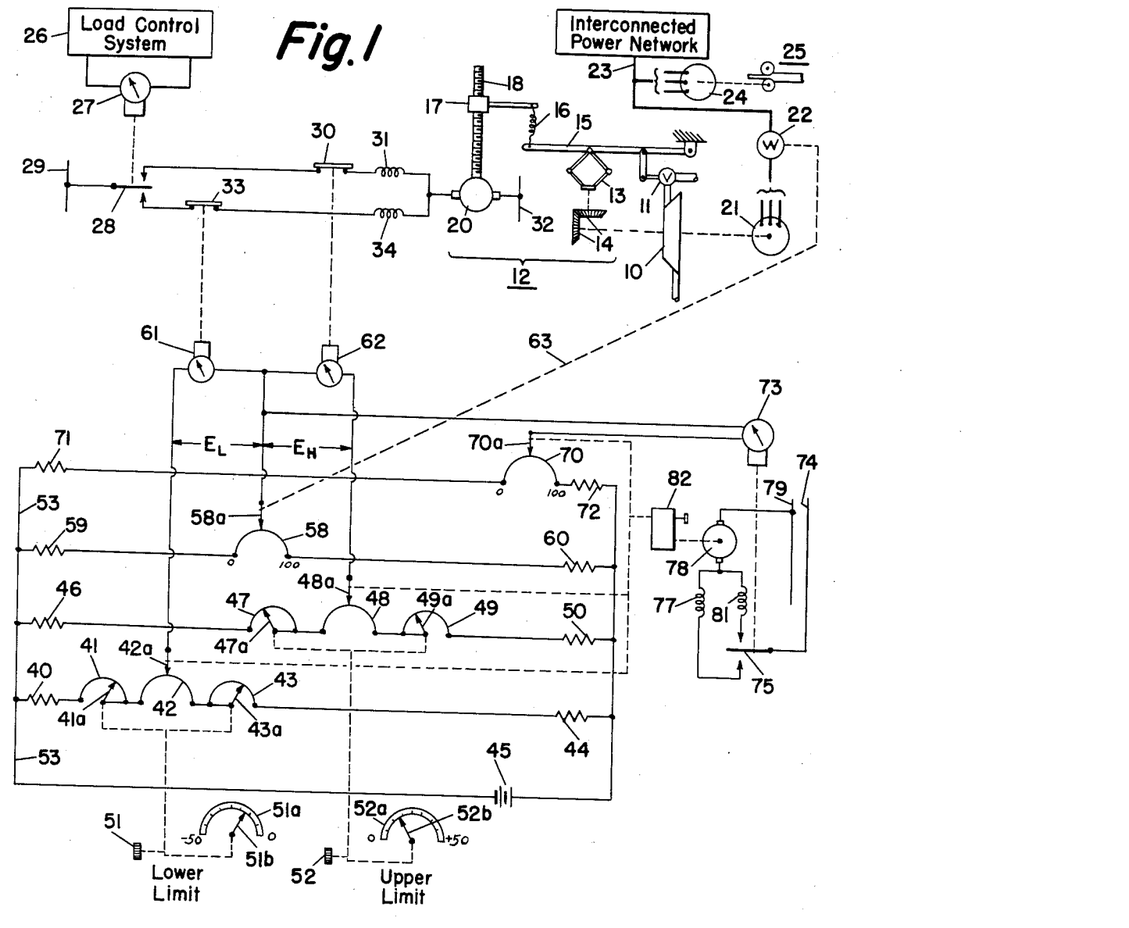
Fig. 1 diagrammatically illustrates an electrical system embodying the invention.

Referring to Fig. 1, the invention in one form has been shown as applied to a prime mover 10 of the steam turbine type, the output it develops being under the control of a valve 11 operable by a load controller 12 including a governor 13 driven from the shaft of the prime mover 10 as by the gears 14. Load-controlling lever 15 is actuated by the governor 13, a governor-biasing spring 16 being adjustable by a traveling nut 17 carried by a threaded shaft 18 driven by a reversible motor 20.

Though suitable as a prime mover for loads of differing character, the turbine 10 is shown driving an alternator 21 connected by a transmission line 23 to an interconnected distribution network shown as a block. The alternator also supplies fringe loads, such as imposed by a motor 24 driving a rolling mill 25.

Though useful where a single prime mover drives a single generator, the present invention is equally applicable to individual units which form components of power distribution networks where load control systems of various kinds may be provided, such a system being illustrated symbolically by the block 26. For example, the system may be of the character disclosed in patent application Serial No. 359,514, filed June 4, 1953, by Clark Nichols and James B. Carolus, now Patent No. 2,692,342. The description of such a system appears in "Power Apparatus and Systems" of the A. I. E. E. No. 6, of June 1953, pages 447–459, by Clark Nichols, and entitled "Techniques in handling load-regulating problems on interconnected power systems."

The load control system 26 produces an output signal which is shown applied to a sensitive device 27 for operating a single-pole, double-throw switch 28 in one direction or the other respectively to increase and to decrease the output of the prime mover 10. The device 27 may be a sensitive polarized relay, or it may take the form of a mechanical relay, such as shown in Squibb Patent No. 1,935,732, or it may be electronic in character, such as the devices of Williams patents, Nos. 2,113,164 and 2,367,746. The symbol for such a sensitive device will be used for other similar detectors without repeating the foregoing discussion of them.

If the load control system responds to the network's demand either for a sustained load change or for a fringe load, a circuit through one of the contacts of the switch 28 is closed, for example through the upper contact for a desired increased generator output. The circuit is traced from supply conductor 29, upper contact of switch 28, limiting contact 30, a "raise" motor winding 31, and by way of motor 20 to the other supply conductor 32. The motor 20 is thereupon energized in a direction to adjust the governor 13 to open the valve 11 to increase the steam input to the turbine 10. With the increased output of turbine 10, the generator 21 increases the load which it carries as by increasing its output delivered to the transmission line 23. If the load control system 26 responds to a decreased load demand, the switch 28 establishes through its lower stationary contact a circuit through limit contact 33 for the "lower" motor winding 34 to energize the motor in the reverse direction for operation of governor 13 and of valve 11 to reduce the steam input to turbine 10 for reduction in the load carried by the alternator 21.

So long as changes in load upon the prime mover or turbine 10 fall within the width of a load-regulation band, there is no limit established as to the rate of change of load. However, if the load demand upon the turbine 10 is changed to a value outside of the band, as beyond one or the other of the limits, a corresponding one of limit switches 30 and 33 operates to restrict the rate of change of output of the turbine to a rate not exceeding said permissible rate. The manner in which the limit switches are so controlled will now be set forth.

The lower limit of the band is in part determined by the branch of a balanceable network, supplied from any suitable source, such as the battery 45, and including end coil 40, slidewires 41—43 and end coil 44. The upper limit of the band is in part determined by the branch of the balanceable network including the end coil 46, slidewires 47—49 and end coil or resistor 50.

Slidewire contacts 42a and 48a are illustrated midway of their respective slidewires 42 and 48. A predetermined potential difference or a voltage between slidewire contacts 42a and 48a is established by the relative adjustments of slidewires 41 and 43 in one branch and slidewires 47 and 49 in the other branch. Slidewires 41 and 43 have their associated contacts ganged together for manual operation as by a setter knob 51 having an associated scale 51a and pointer 51b; similarly, the contacts of slidewires 47 and 49 are ganged together for simultaneous adjustment by setter knob 52 which has associated therewith scale 52a and point 52b. As setter 51 moves contacts 41a and 43a to the left, it will be observed that the resistance of slidewire 41 will be decreased, while the resistance of slidewire 43 in series-circuit with slidewire 42 will be increased.

The resistance of the "lower limit" branch including slidewire 42 remains unchanged during adjustment of setter 51. But the voltage or potential difference between contact 42a and one side of the source, as conductor 53, will decrease with decreasing resistance of slidewire 41 in the branch circuit. For convenience of terminology in the description and in the claims, reference will sometimes be made to "voltages" instead of to "potential differences," the two terms being understood as generally synonymous. Taking conductor 53 as a convenient reference point, and with constant current always flowing through slidewire 42, it will be observed that if the contact of slidewire 41 is at its left-most position, there will be zero drop of potential across slidewire 41, and thus the voltage or potential difference between contact 42a and conductor 53 will be due entirely to the voltage drop across end coil 40 and that across that part of slidewire 42 to the left of its contact 42a. Change in position of contact 42a will vary the voltage between it and conductor 53 without changing the current through the slidewire 42.

As the contact 41a of slidewire 41 is moved from its left-most position to the right, the potential drop from conductor 53 to contact 42a will be gradually increased until it is a maximum with the contact 41a in its right-most position. As shown, the slidewire contacts 41a and 43a are in positions somewhat right of center.

The upper limit-determining branch including slide-wire 48 functions in generally the same way as the previously described branch. When the slidewire contact 47a is in its left-most position, slidewire 47 will be effectively removed from the branch circuit, and thus the potential difference or voltage between conductor 53 and contact 48a will be a minimum, and pointer 52b will be at zero on scale 52a. The potential difference will be increased by moving contact 47a toward its right-hand position. It will be observed that the slidewire contacts 47a and 49a have been set to positions somewhat left of center. A dial 51a associated with setter 51 may be calibrated from —50 to zero, and a dial 52a associated with setter 52 may be calibrated from zero to +50. Such calibrations mean that with the setters 51 and 52 in their zero positions (with slidewire contacts 41a and 43a in their right-most positions, and contacts 47a and 49a in their left-most positions), the regulation band will be of zero width, which is to say that the turbine 10 can have its output changed only at a permissible low rate and not at the unlimited rate at which it can be changed within a regulation band of finite width.

As the setter 51 moves the contacts 41a and 43a to the left from their assumed zero positions, the potential difference or voltage between reference conductor 53 and contact 42a of slidewire 42 decreases. Movement of contacts 47a and 49a to the right by setter 52 increases the voltage between reference conductor 53 and contact 48a. Thus the spacing between the low and high limits of the regulation band is determined by the positions of setters 51 and 52.

The calibrations from —50 to zero, and from zero to +50 are convenient and provide a system in which the regulation band may be of zero width and one in which that band may coincide with the full output capacity of the turbine 10. To achieve such calibrations, the resistance values of slidewires 42 and 48 will be assumed to have equal resistance values which may be represented by R. End coil 40 and slidewires 41 and 43 may have resistance values represented by $$\frac{R}{2}$$

while end coil 44 will have a resistance equal to R. Similarly, end coil 46 in the high limit branch will have a resistance value equal to R, while slidewires 47, 49 and end coil 50 will each have resistances equal to $$\frac{R}{2}$$

(In the foregoing the slidewire resistance values are those existing when their total resistance is inserted into the respective branches of the network.)

The limit-network includes a comparison voltage branch including slidewire 58 and end coils or resistors 59 and 60, each having resistance values represented by R. A sensitive high impedance detector or relay 61 is connected between slidewire contacts 42a and 58a; and a detector or relay 62 is connected between slidewire contact 58a and slidewire contact 48a.

The position of contact 58a relative to its slidewire 58 is determined by the output of, or the load upon, alternator 21. As shown a wattmeter 22 operates, as indicated by the broken line 63, to position contact 58a on slidewire 58. Since slidewire contacts 42a, 48a and 58a are illustrated in the same angular positions (midway thereof) relative to their respective slidewires and since dials 51a and 52a are shown as having like negative and positive limit values, it is known that the output of alternator 21 is midway of a regulation band 56 and is at the point 64 in Fig. 2; the points 55 and 57 identifying the lower and upper limits of the regulation band.

There are applied to the detectors or relays 61 and 62 the voltages $E_L$ and $E_H$. However, the voltage $E_L$ applied to the lower-limit detector 61 has a polarity such that current tends to flow from contact 58a through detector 61 and thence to contact 42a. Such direction of current flow is not effective to operate detector 61 to open the motor circuit through limit contact 33. Similarly, the polarity of the voltage $E_H$ is such that current tends to flow from contact 48a through the detector 62 to slidewire contact 58a. Again the direction is such that detector 62 will not operate its limit contact 30 to open the motor circuit. It will open that circuit when the polarity of the voltage $E_H$ has been reversed. The detectors 61 and 62 may include vacuum tubes or other devices to provide high resistance or high impedance input circuits to make them primarily voltage-responsive devices rather than current-responsive devices.

The manner in which the polarities of the voltages $E_H$ and $E_L$ are varied with change in output of turbine 10 and the manner in which their polarities may reverse to produce actuation of contacts 33 and 30 by detectors 61 and 62 will now be described.

Assuming for the moment that slidewire contacts 42a and 48a remain in fixed positions and that only slidewire contact 58a is moved, it will be seen that as contact 58a is moved to the left and toward its "zero" load-representing position, the voltage $E_L$ will be gradually reduced. When contact 58a has been moved to a point where the sum of the resistance from contact 58a to the left-hand end of slidewire 58 and the resistance of end coil 59 is less than the sum of the resistances of end coil 40 and the left-hand portions of slidewires 41 and 42, the polarity of the voltage $E_L$ will have been reversed and the detector 61 will be energized to operate its limit contact 33 to open the motor circuit. The relay 61 is desirably of high sensitivity so that a small difference in potential will produce the limiting action resulting from operation of contact 33.

Similarly, as contact 58a is moved to the right, the voltage $E_H$ decreases in magnitude, and upon reversal of $E_H$, detector 62 is energized to operate contact 30 to open the motor circuit. Accordingly, as the load upon the turbine 10, as reflected by the wattmeter 22, rises above limit 57 of Fig. 2 or falls below limit 55, detectors 62 and 61 will be respectively energized in the manner described to open one or the other of switch contacts 30 and 33.

Inasmuch as the regulation band is to follow changes in load upon, or output of, the turbine 10, the band as a whole is shifted with load but at a rate corresponding with a permissible rate of change of load on turbine 10. To this end, there is provided in the network a fourth branch including a slidewire 70 and end coils 71 and 72, each having a resistance value equal to R. A detector 73 is responsive to voltage between contact 58a of slidewire 58 and contact 70a of slidewire 70. With contact 70a in the same relative position as contact 58a, there will be zero voltage or potential difference applied to detector 73. However, as contact 58a is moved by wattmeter 22 to the right or to the left, a voltage of one polarity or the other will be applied to detector 73.

When the movement of contact 58a is to the left, indicating a decrease in load, detector 73 operates a single-pole, double-throw switch 75 to complete a circuit from a supply line 74 through its lower stationary contact, a "lower" motor winding 77, motor 78 and to the other supply line 79. Movement of slidewire contact 58a to the right corresponding with an increase in load produces energization of detector 73 which operates the switch 75 to complete a circuit through its upper stationary contact, the "raise" motor winding 81, and thence through the motor to the supply line 79.

The motor 78 through a suitable adjustable speed-determining device 82 adjusts contacts 42a, 48a and 70a relative to their respective slidewires, all as shown by the broken lines.

It is to be understood that in all modifications of the invention, the slidewire contacts have in general been described as movable relative to their stationary slidewires. In practice the slidewires are generally moved relative to their stationary contacts. Either arrangement can be used, and wherever it is said that the slidewire contact is moved, it is to be expressly understood the slidewire may be moved relatively to its contact.

The constant speed with which slidewire contacts 42a, 48a and 70a are moved is selected, as by adjustment of speed-determining device 82, in terms of the change of voltage per unit length of the respective slidewires so that the rate of change of the voltage produced by each of them corresponds with the permissible rate of change of load on the turbine 10. The permissible rate of change of load upon the turbine 10, or strictly speaking, the permissible rate of change of output which it is the purpose of limit contacts 30 and 33 to establish, will differ with different kinds of prime movers and will be dependent upon their particular operating characteristics. When the load exceeds one or the other of limits 55 or 57 of Fig. 2, the permissible or predetermined rate of change of load on the turbine 10 established by operation of limit contacts 30 and 33 will be that which the turbine 10 can safely accommodate over long periods of time. That is what "permissible" or "predetermined" rates of change of load mean even though such rates are not linear in character. They are not linear in the modifications of Figs. 4 and 5, as will later be made clear, though they are permissible and also predetermined limited rates.

The manner in which the foregoing operations are attained will now be explained with the aid of the graph of Fig. 2. First, it will be assumed that the output of the turbine 10 is rising from the point 64 at a high rate as indicated by the relatively steep slope of the graph 58c. That output, of course, repeatedly rises as a result of the operation of detector 27 in maintaining switch 28 closed for energization of motor 20 through the "raise" winding 31 to increase the tension on governor spring 16 for greater opening of valve 11 and increased admission of steam to turbine 10. The increased output needed for turbine 10 to meet an increased load demand is determined by the load control system 26. As turbine 10 increases its output and alternator 21 correspondingly increases its output, wattmeter 22 through connection 63 moves contact 58a toward the right. Its speed of movement corresponds with the slope of the graph 58c.

Immediately upon movement of contact 58a, detector 73 operates switch 75 to energize motor 78 through winding 81 to move contact 70a toward the right and simultaneously to move contacts 48a and 42a to the right. However, the rate of movement of contacts 42a, 48a and 70a cannot exceed that determined by speed-adjusting device 82 and cannot exceed the slope of corresponding graphs 42c, 48c and 70c initially and respectively representative of the upward movement of the regulation band 56 with increasing load upon, or output of, the prime mover 10.

Since the voltage change due to adjustment of slidewire contact 58a (graph 58c) is at a greater rate than the rise of voltages at 48a and 70a, graphs 48c and 70c, the voltage $E_H$, (Fig. 1) is reduced to zero and reverses in polarity at approximately the time $t_1$. Detector 62 is thereupon energized to open the motor circuit through contact 30 to prevent further increase in output of turbine 10 due to adjustment of the load controller 12 including governor 13, as through spring 16. Accordingly, the output of turbine 10 is stabilized or temporarily limited to the value attained at the time $t_1$, and thus wattmeter 22 does not produce further movement of slidewire contact 58a. However, since slidewire contact 58a has been moving at a higher rate than slidewire contact 70a, a signal or error voltage continues to be applied to detector 73. Accordingly, during the period that contact 58a is at standstill, the detector 73 still responds to the signal voltage between contacts 58a and 70a. Motor 78 continues to be energized in a direction to reduce the error voltage to zero. In so doing, the regulation band continues to move upwardly, as indicated by the initial portions of graphs 42c and 48c.

As soon as the voltage represented by the graph 48c rises above that attained by contact 58a, the detector 62 responds and closes contact 30 to energize the motor 20 for further adjustment of governor 13 to increase the output of turbine 10. The cycle of operations just described with short-time energization of motor 20, is repeated at such a rate that the increase in output of turbine 10, as reflected by wattmeter 22 and by the change in position of contact 58a, closely follows graph 48c. For all practical purposes graph 58c then coincides with graph 48c.

It is to be observed that there has not been imposed upon the load controller 12 any restriction as to the rate at which the output of turbine 10 may be changed so long as such change in output lies between the lower limit, as shown by graph 42c, and the upper limit, as shown by graph 48c. In the ultimate, the rate of change of output of the turbine 10 within the band may be infinite, but upon attainment of a load change corresponding to the upper limit 48c, as at time $t_1$ subsequent changes of output are at limited rate only.

At time $t_2$, when the load control system 26 calls for a reduction in output of turbine 10, a different action takes place.

To reduce the output of turbine 10, the switch 28 is operated downwardly to energize the "lower" motor winding 34 for adjustment of governor 13 in a direction to decrease the output of turbine 10. The resultant decrease of generation of alternator 21 appears at wattmeter 22 and moves the slidewire contact 58a in the opposit direction or toward the left. Such movement of contact 58a reverses the direction of the control signal applied to detector 73 when the potential at contact 58a becomes equal to the potential at contact 70a and produces operation of switch 75 for energization of motor 78 through field winding 77 for rotation in the opposite direction to move slidewire contacts 42a, 48a and 70a toward the left. The movement of contact 58a to the left reduces the potential difference between it and conductor 53. That reduction is illustrated by the downwardly extending graph 58d. As graph 58d intersects graph 70c the potential difference applied to detector 73 will have been reduced to zero. Reversal of the polarity of that potential difference causes detector 73 to energize motor 78 for reverse operation to move slidewire contacts 70a, 48a and 42a to the left. The downward slope of the graphs 48c and 42c illustrates the foregoing operations.

It will be now assumed that the load control system 26 has called for a reduction in output at high rate as indicated by the graph 58d which has a slope much greater than that of the downward movement of band 56 as shown by the limit graphs 42c and 48c.

As the graph 58d showing the decreasing output of turbine 10 arrives at the lower limit 42c, the voltage $E_L$ is reversed in direction for energization of detector 61 for the opening of the motor circuit through contact 33. Since the movement of slidewire contact 58a occurred at a higher rate than that of slidewire contact 42a, an error voltage still exists at detector 73 and motor 78 continues to move slidewire contacts 42a, 48a and 70a as illustrated by graphs 48c and 42c between times $t_3$ and $t_4$. If the load demand on alternator 21 continues to decrease at high rate the unloading of turbine 10 continues at the limited rate represented by the slope of the regulation band between times $t_3$ and $t_4$.

It will now be assumed that at time $t_4$, the load control system 26 requires increased output of turbine 10, with energization of motor 20 through winding 31. As the output is increased, wattmeter 22 moves contact 58a to the right, the rise in voltage being illustrated by the graph 58e. As before, when graph 58e intersects graph 70c, the voltage or potential difference applied to detector 73 will again have been reduced to zero, and upon reversal, motor 78 again reverses with a resultant change in the slope of graphs 42c and 48c, these now extending upwardly. At time $t_5$ it will be assumed that the change in output of turbine 10 as determined by the load control system 26 is to be at a lower rate than the established permissible rate indicated by the slope of the graphs 42c, 70c and 48c. Such requirements mean that contact 70a will be adjusted by motor 78 and device 82 at a rate which closely keeps up with the change in position of slidewire contact 58a. Thus, the difference voltage between them does not materially change, and the graph 70c beyond the time $t_5$ is representative of both its change of potential relative to conductor 53 and to the rate of change of output of turbine 10. During the operation beyond the time $t_5$, the limits as represented by the graphs 42c and 48c rise at the same rate as the graph 70c, though at a lower rate than the safe permissible rate which is automatically made effective when the load control system 26 requires rates of change of output of turbine 10 greater than that shown by graph 70c.

With the foregoing understanding of the invention, it will be understood, of course, that the width of the band 56 can be changed by adjustment of either of knobs 51 and 52 independently to move the graphs 42c and 48c toward and away from the graph 70c. When graphs 42c and 48c coincide with graph 70c the regulation band is at zero width, a condition not likely to be useful in the field. When setter knobs 51 and 52 move their respective slidewires to coincide with −50 and +50 on their respective scales, the graph, such as 58c, representative of change in voltage with change of position of slidewire contact 58a, will never attain either limit until the turbine 10 be either fully loaded or fully unloaded, again a condition not likely to be useful in the field. The limit adjustments which can be attained by setter knobs 51 and 52 do illustrate the flexibility provided in the operation of the system to meet abnormal conditions of operation which do not ordinarily arise.

For ease in understanding the operation of the system of Fig. 1, the power supply for the load-limiting network is shown as a battery 45. Obviously, any source of unidirectional current may be used, but in general the network will be supplied with alternating current. With the network connected to an alternating current source, the error voltages $E_L$ and $E_H$ will upon attainment of one or the other limits of band 56 respectively reverse in phase relative to the voltage applied to the input terminals. Similarly, there will be a like 180° reversal in phase of voltage applied to detector 73 as one or the other of the potentials of slidewire contacts 58a and 70a relative to conductor 53 rises above or falls below the other. For alternating current, the detectors 61, 62 and 73 will be of the phase-sensitive type. Suitable detectors are well known to those skilled in the art. They may be of the type shown in Fig. 5. With alternating-current supply to the bridge network, the circuit components, which have been described as resistors, may, of course, take the form of impedances, of the fixed and adjustable type, as indicated by the symbols used in Fig. 1. Similarly, the speed-determining device 82 may be either of the type which regulates the speed of motor 78, or motor 78 may be of the constant speed type, and device 82 a speed changer. It need not be continuously adjustable but may comprise gears 82, Fig. 3, establishing a suitable gear ratio between the motor shaft and the mechanical drives for the respective slidewire contacts 42a, 48a and 70a.

With the above understanding of the invention, it will be understood that many modifications may be made within the scope of the claims; the load-limiting network itself may take different electrical forms some of which will now be described.

Figure 3:
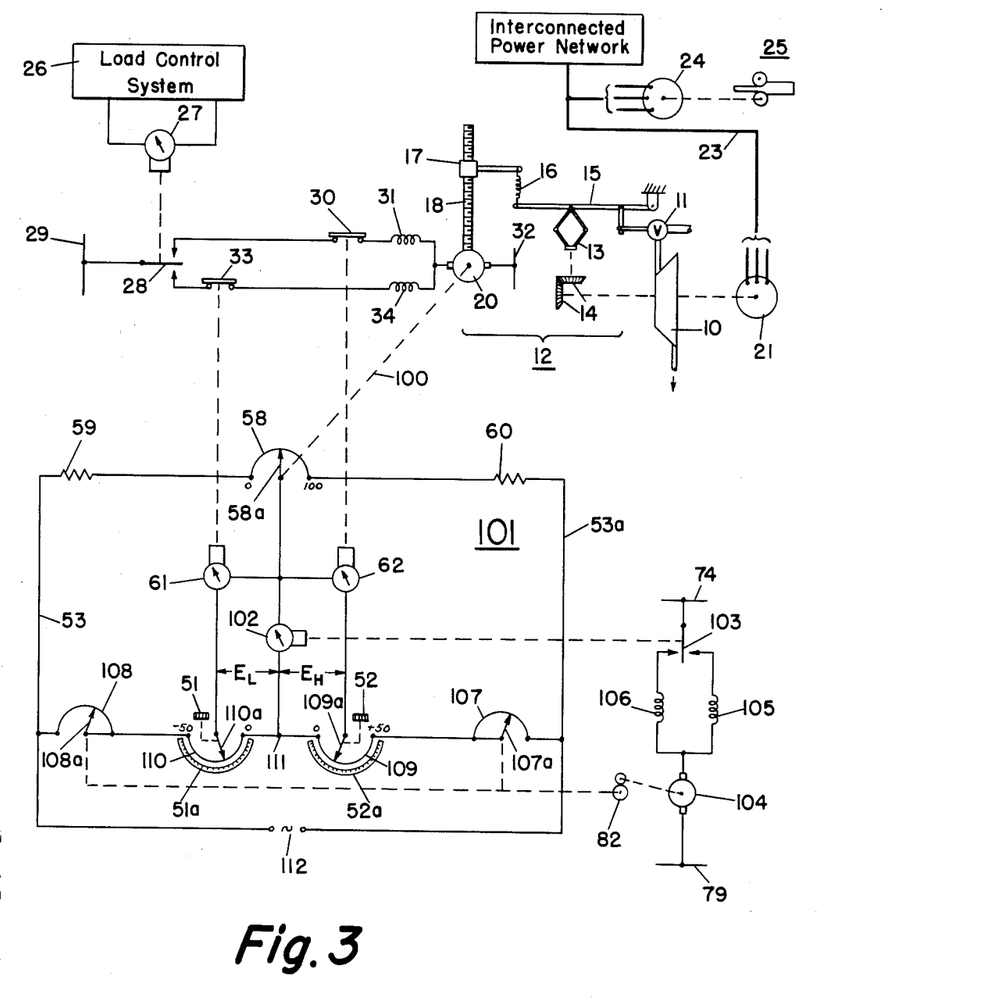
Fig. 3 is a wiring diagram illustrating a further modification of the invention.

In Fig. 3 and in subsequent modifications like parts have been given like reference characters. It will be recalled that the output of turbine 10 and the output of alternator 21 are under the control of the load-control system 26. When the alternator 21 is to supply a greater load or its output is to be increased, the detector 27 energizes the raise winding 31 to increase the output of turbine 10. Accordingly, the position of the traveling nut 17 along the threaded shaft 18 is related to, and provides some indication of, the output of alternator 21, since the adjustment of that traveling nut determines the load-regulating action of the governor 13. For the foregoing reasons, the slidewire contact 58a is driven by the motor 20, the position of that contact adequately representing the output of turbine 10. Such a mechanical drive has been indicated by broken line 100 and takes the place of the wattmeter and mechanical drive 63 shown in Fig. 1. Such a modification may also be embodied in the system of Fig. 1.

In Fig. 3 it will be assumed that the load-limiting network 101 is in electrical balance and that motor 20 has been energized in a direction to increase the output of turbine 10 and thus to move slidewire contact 58a to the right. Accordingly, an error voltage is immediately applied to a detector 102 which moves a single-pole, double-throw switch 103 to the right to energize a motor 104 through raise winding 105. The motor 104, through speed-determining device 82, shown as a pair of gears, relatively adjusts slidewire contacts 107a and 108a relative to their slidewires 107 and 108. Since slidewire contact 58a was moved to the right, slidewire contacts 107a and 108a will be moved to the right to reduce the error voltage between contact 58a and point 111. When slidewire contact 107a decreases or increases the resistance in the branch, slidewire contact 108a increases or decreases the resistance in the branch by the same amount so that the current flowing through slidewires 109 and 110 is at all times held constant.

Inasmuch as contact 58a in moving to the right moves to a point of higher potential with respect to conductor 53 again taken as a convenient reference, it will be seen that the point 111 is raised in potential relative to conductor 53 by the same amount due to the increased potential drop between conductor 53 and point 111. That drop is made greater since contact 108a is moved by motor 104 to increase the resistance of slidewire 108 connected in the branch circuit.

It is now to be observed that the voltage between contact 58a of slidewire 58 and contact 109a of slidewire 109 is applied to detector 62. With contacts 58a and 109a in their illustrated positions, the potential at contact 58a is with respect to conductor 53 less than the potential of slidewire contact 109a with respect to conductor 53. The phase-sensitive detector 62 does not respond to such potential difference, but it does respond when the potential at 58a is greater than that at contact 109a corresponding with a 180° phase reversal. The operation is the same as described with reversal of polarity when direct current forms the source of supply instead of the alternating-current source 112.

As slidewire contact 58a is moved by motor 20 at higher rate than the corresponding movement of slidewire contacts 107a and 108a, the potential difference between slidewire contacts 58a and 109a decreases, and when slidewire contact 58a with respect to conductor 53 is at a higher potential than is contact 109a with respect to that conductor, detector 62 responds to open load-limiting switch 30 to deenergize motor 20.

Figure 2:
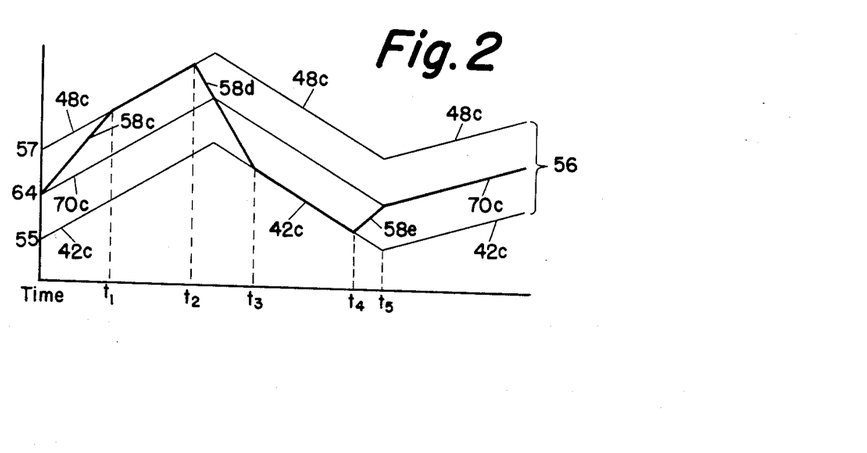
Fig. 2 is a graph useful in explaining the operation of the system of Fig. 1.

The graph of Fig. 2 applies equally well to the modification of Fig. 3 in which the operation just described is illustrated by the graph 58c arriving at the upper limit 48c at the time $t_1$ when detector 62 opens load-limit contacts 30, the graphs 48c and 42c in Fig. 2 illustrating respectively the change in potentials at slidewire contacts 109a and 110a due to adjustments of slidewire contacts 107a and 108a. The width of the regulation band 56 is determined by the setter knobs 51 and 52 respectively used for adjusting slidewire contacts 110a and 109a relative to the scales 51a and 52a.

From the foregoing description, it will be seen that when the load-control system 26 calls for decreased output of turbine 10, the motor 20 is energized to move slidewire contact 58a to the left, and switch 103 energizes motor 104 through winding 106 to move slidewire contacts 107a and 108a to the left. When contact 58a is moved at a higher rate than contacts 107a and 108a, the potential of contact 58a relative to conductor 53 will be decreased below the potential of slidewire contact 110a relative to conductor 53. The detector 61, upon phase reversal, opens load-limiting contacts 33 to bring motor 20 to standstill, the operation corresponding with that illustrated in Fig. 2 at time $t_3$.

As in Fig. 1, the reference voltages at slidewire contacts 109a and 110a are separately adjustable by setter knobs 51 and 52 to narrow or widen the regulation band. End coils in the two branches of the network may be added for purposes of producing selected ranges of adjustment which will appear on scales 51a and 52a. The comparison voltage whose magnitude varies with alternator load and turbine output is taken at slidewire contact 58a. For convenience all control voltages have been taken with reference to common conductor 53. The other conductor 53a forms an equally convenient reference.

Figure 4:
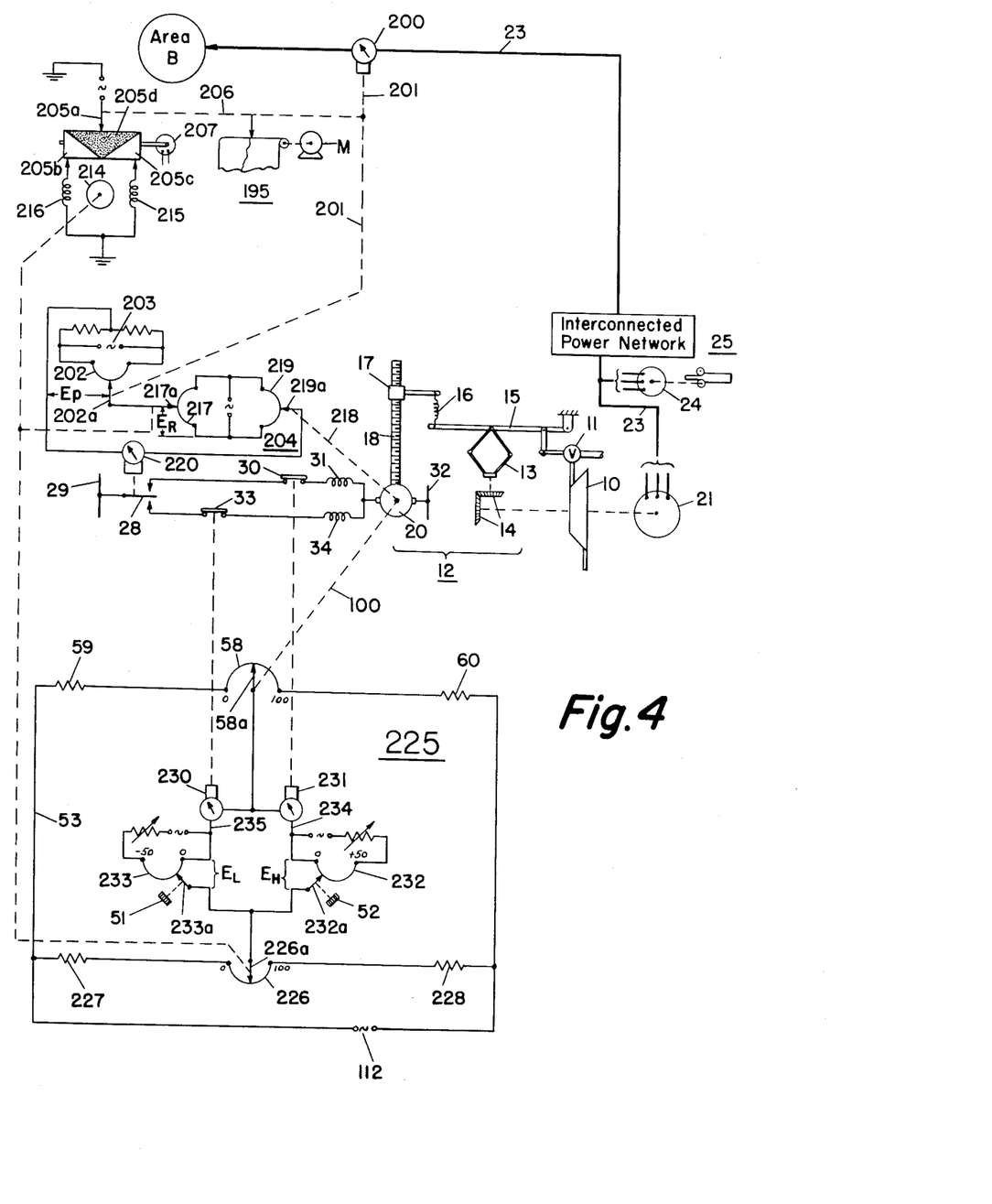
Fig. 4 is a wiring diagram illustrating a further modification of the invention.

In Fig. 4 the load-control system 26 of Figs. 1 and 3 has been illustrated somewhat more in detail and in connection with an extension of the tieline 23 to another interconnected power network or "area B." Where a number of power-generating stations, each with a plurality of generators or alternators, all contribute to the carrying of the load on the various tielines, the load-control system may operate in response to one or more system parameters. For example, a wattmeter, such as previously illustrated, may be utilized, but more generally, the load-control signal will be derived from a plurality of variables, such as the deviation in system frequency from 60 cycles per second, the time integral of that deviation, the scheduled load for a particular station, and the variation in load on that station as imposed by the nearby area which it serves. Thus, the detector 200 in Fig. 4 responds to such parameters, the controlled variable, to adjust through mechanical connection 201 the slidewire contact 202a of slidewire 202 of a network 203 to introduce a voltage $E_P$ into a network 204 representative of the deviation of the system from the set point. Thus, the magnitude of the voltage $E_P$ produces through detector 220 and motor 20, a corresponding adjustment of governor 13 proportionally to change the output of turbine 10 as the system condition deviates from the set point. Deviation of the controlled variable from the set point may be recorded by recorder 195.

The load-control system also produces reset action, i. e., an adjustment in accordance with the time integral of deviation of the controlled variable from the set point, as through the operation of detector 200 to adjust, through a mechanical connection 206, a contact 205a of a controller having conducting segments 205b and 205c separated by an insulating segment 205d. The controller is in the form of a cylindrical drum driven by a motor 207, preferably at constant speed. As the system condition varies from the set point, the contact 205a will be moved to the right or the left, and the duration of its engagement with one or the other of conducting segments 205b and 205c will be varied. Now assuming that the system condition is below the desired value, the set point, unbalance appearing at network 204 is in a direction to energize detector 220 in a direction to close through switch 28 an energizing circuit through the raise motor winding 31 for motor 20. Motor 20, through mechanical connection 218, drives contact 219a of slidewire 219 included in network 204 in a direction tending to rebalance network 204.

From the foregoing, it will be seen that the motor 20 responds to a proportional action resulting from the introduction of voltage $E_P$ into network 204 and also to the reset action determined by the relative length of the pulses flowing through winding 215 of motor 214 and the duration of that flow which through adjustment of contact 217a introduces voltage $E_R$ into network 204.

The output-limiting network 225 of Fig. 4 includes the slidewire 53 whose contact 58a is driven by motor 20 and, hence, its movement is related to the sum of the proportional and reset actions. Network 225 also includes a slidewire 226 in a branch including end coils 227 and 228 with movable slidewire contact 226a adjusted by the motor 214 whose operation corresponds with the reset action. Inasmuch as the potential differences between slidewire contact 58a and conductor 53 and between slidewire contact 226a and conductor 53 are with respect to detectors 230 and 231 opposed, they will respond to potential differences representative of proportional action adjustment of load controller 12.

The speed-limiting or speed-adjusting device 82 of Figs. 1 and 3 has been omitted in Fig. 4 for the reason that the controller including the conducting segments 205b and 205c are themselves speed-limited devices and assure operation of motor 214 at a limited rate, and at a speed not exceeding that which can be produced with movable contact 205a in either of its extreme right or left-hand positions. There is not present such a speed-limiting device for motor 20 and, hence, that motor can, and does, operate at higher speeds than does the motor 214. Accordingly, slidewire contact 58a can be moved at a greater speed than slidewire contact 226a.

By providing between slidewire contacts 58a and 226a the detector 231 in series with an adjustable voltage $E_H$, the upper limit of the regulation band 56 of Fig. 2 will be determined. Similarly, by connecting an adjustable voltage $E_L$ in series with detector 230, the lower limit of the regulation band will be determined. These adjustable voltages may be obtained in any suitable manner, such for example, as by adjustable contacts 232a and 233a respectively associated with slidewires 232 and 233 connected to separate sources of alternating current supply, contacts 232a and 233a being adjustable by setter knobs 51 and 52.

The operation of the load-limiting network 225 is, in general, similar to the preceding modifications. As slidewire contact 58a is moved to the right corresponding with an increased output for turbine 10, the potential difference between that contact and conductor 53 is increased. When the increase occurs at a rate such that the potential drop between conductor 234 and conductor 53 becomes less than the potential difference between slidewire contact 58a and conductor 53, the detector 231 is energized to open load-limiting contacts 30. This operation corresponds with time $t_1$ of Fig. 2.

Conversely, when the load-control system 26 calls for reduced load on alternator 10, slidewire contact 58a may be moving to the left at a greater rate than slidewire contact 226a, and when the potential difference between conductors 235 and 53 is made greater than the potential difference between slidewire contact 58a and conductor 53, detector 230 is energized to open load-limiting contacts 33. This operation corresponds with time $t_3$ of Fig. 2.

In the modification of Fig. 4 the regulation band rises and falls at a limited rate with change in output of turbine 10 by reason of the adjustment of contacts 226a of slidewire 226. More particularly, since contact 226a is adjusted by motor 214 in accordance with the reset action, when the load or desired output of prime mover 10 is rising, the motor 214 will be energized in accordance with the time integral of the deviation in the upward direction from the set point. Thus contact 226a will be moved to the right to cause the regulation band to rise. It rises at a limited rate established by the maximum speed of operation of motor 214 which is materially less than the maximum speed of operation of motor 20. Conversely, the regulation band will follow downwardly decreasing load demands upon the turbine 10 as reflected by the operation of the detector 200.

While reference has been made to the explanatory graphs of Fig. 2, it is to be understood that it is but generally representative of the operation of the modification of Fig. 4. In accordance with the system of Fig. 4 the lower and upper limits 42c and 48c will be represented by curved lines instead of the straight lines shown in Fig. 2 for the reason that slidewire contact 226a is adjusted by motor 214 as a function of the magnitude of the reset action which varies with extent and time of deviation from the set point.

Figure 5:
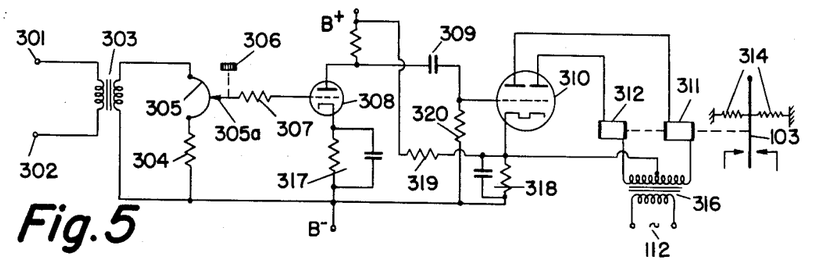
Fig. 5 is a schematic diagram of one suitable type of high impedance detector.

While high impedance detectors of any suitable type may be employed for those referred to above, there has been shown in Fig. 5 the details of one satisfactory form of phase-sensitive detector. The input circuit is connected to input terminals 301 and 302 which are connected to a primary winding of a transformer 303 of the high impedance type. The secondary winding of transformer 303 is connected across a resistor 304 and a slidewire 305, the movable contact 305a of which is adjustable by a knob 306. The voltage appearing across the lower half of slidewire 305 and resistor 304 is applied by way of a grid resistor 307 to the input circuit of vacuum tube 308. The input signal is amplified and applied by way of coupling capacitor 309 to the grids of a double triode 310. The grids for each triode have been illustrated as internally connected together and to a grid-leak resistor 320. The anodes are respectively connected to windings 311 and 312, one of which operates the movable contact of the single-pole, double-throw switch 103 against one stationary contact, and the other coil operates it against the other stationary contact. When neither coil is energized, centering springs 314 maintain the movable contact in an intermediate position and in spaced relation with both stationary contacts.

With the terminals 301 and 302 connected, for example in Fig. 3, to movable contact 58a and to the connection point 111, and with the same source of alternating current 112 applied to the primary winding of a plate supply transformer 316 of Fig. 5, it will be seen that when zero potential difference appears at the input terminals there will be zero output from the tube 310, suitable cathode-biasing means 318 and 319 being provided for zero output with zero input. However, when a potential difference between the contact 58a and the point 111 appears, one of the triode sections of tube 310 will be rendered conductive depending upon the phase relation between the input signal and the alternating current applied to the respective anodes. Thus, if the phase is in one direction, the left-hand triode will be rendered conductive to energize coil 311 to operate the switch 103 to complete a circuit with one of its contacts. Upon 180° reversal of phase, the other or right-hand section will become conductive for energization of coil 312 to operate the movable contact against the other stationary contact. In this way the motor windings 106 and 105 of Fig. 3 will be energized to drive the motor 104 in one direction or the other and for purposes previously described.

The detector of Fig. 5 may be used for the detector 27 of Fig. 3 and for detector 220 of Fig. 4. For detectors 61 and 62 of Fig. 3 and for detectors 230 and 231 of Fig. 4, only one triode section of tube 310 will be utilized for energization of but a single coil for operating a switch from a normally closed position to an open position.

Where the single triode and one relay coil are utilized, it will be understood that a phase relation of input signal to the anode supply in one direction will not make the tube conductive, but upon phase reversal the tube will be rendered conductive for energization of the relay.

With the alternating-current system of Fig. 5 fully described, those skilled in the art will understand the circuit requirements for corresponding operations in the direct-current system of Fig. 1. In the system of Fig. 5, the slidewire 305 is provided for adjusting the sensitivity of the detector, a feature of convenience in operation.

Figure 6:
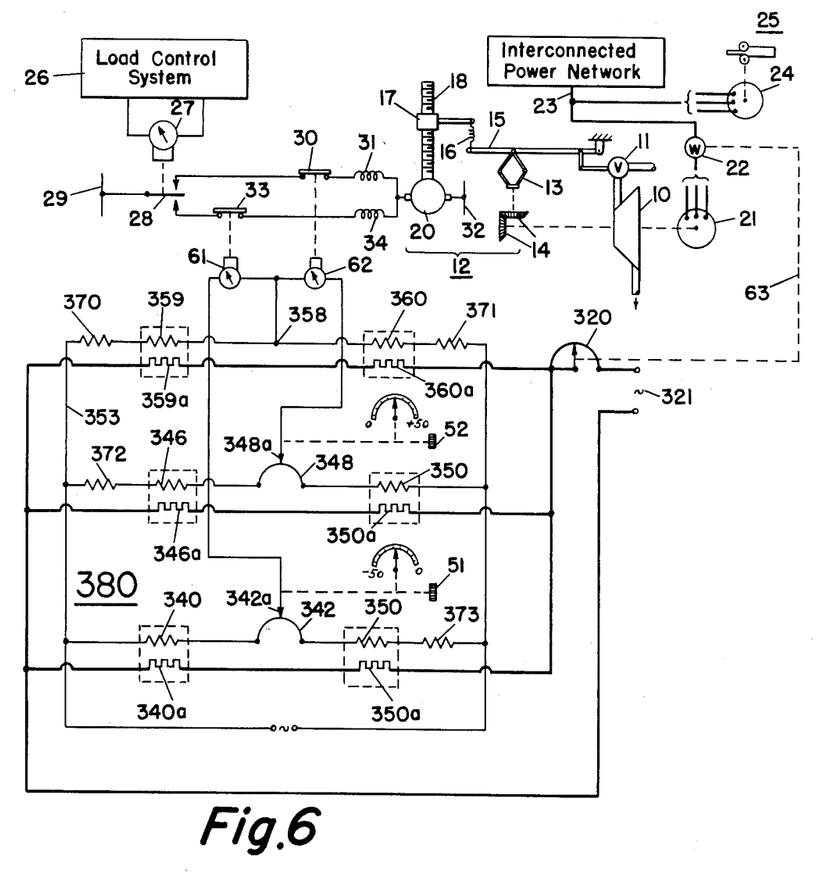
Fig. 6 diagrammatically illustrates another system embodying the invention.

The modification of Fig. 6 while accomplishing the same general objectives of the earlier described modifications, does it in a different way. The detector 62 which operates the limiting switch 30 responds to the potential difference between the point 358 and the slidewire contact 348a of slidewire 348, both in a control network 380 generally similar to the control or limiting networks of the earlier modifications. In Fig. 6, however, one branch of the network includes resistors 359 and 360 respectively associated with heaters in the form of heating resistors 359a and 360a. The resistor 359 has a positive temperature coefficient, and the resistor 360 a negative temperature coefficient of the same magnitude. When both heating resistors are energized in series-circuit relation, the current flow through the branch including resistors 359 and 360 does not change in magnitude because the resistance thereof does not change.

The resistances 359 and 360 and their associated heaters may be of the type described in Davis Patent No. 2,325,308, the assembly 359—359a having a low heat lag, the construction being such that the temperature of resistance 359 rather closely follows change in temperature of the heater 359a. The assembly 360—360a has the same heating characteristics as the assembly 359—359a.

In a second branch of the network, similar assemblies 346—346a and 350—350a are provided respectively with like positive and negative temperature coefficients except that they are thermally lagged so that the temperatures of these resistors change rather slowly as compared with the temperature change of resistors 359 and 360. Similarly, the assemblies 340—340a and 350—350a respectively with like positive and negative temperature coefficients are thermally lagged for slow change in temperature of the resistances. The respective heaters for the three branches of the network are energized under the control of a regulating device of any suitable type, such as a variable auto-transformer sold under the name of "Variac"; for simplicity shown as a series rheostat 320, from an alternating-current source of supply 321. The detector 62 responds to the potential difference between point 358 and slidewire contact 348a, while detector 61 responds to the potential difference between point 358 and slidewire contact 342a of slidewire 342 included in a third branch of the network. The rheostat 320 is operated by the wattmeter 22, and the limiting network 380 limits load changes on turbine 10 to permissible or predetermined rates, if such load changes tend to exceed the limits of the regulation band previously discussed.

As exemplary of resistance values, if resistors 359 and 360 have values which may be represented by R, then in the first branch of the network the resistors 370 and 371 will have values equal to ½ R, the foregoing values being those at thermal equilibrium with the rheostat set at its mid-position, as illustrated. In the second branch of the network, resistors 346 and 350 will be equal to R, and end coil 372 will be equal to ½ R. Slidewire 348 will be equal to ½ R. In the third branch of the network, resistors 340 and 350 will be equal to R, and end coil 373 will be equal to ½ R, as will slidewire 342. The upper limit of the regulation band will be determined by the setting of slidewire contact 348a, a setter knob 52 being illustrated along with a scale for that purpose. Similarly, the lower limit will be established by the setting of slidewire contact 342a as by the knob 51, a scale again being shown for ease in establishing the lower limit. The operation of the system as a whole is similar to those previously described (Figs. 1 and 2), the principal difference being that the graphs showing the load regulation band under different load conditions will not be represented by linear graphs. The limits of the regulation band will remain separated by an amount determined by the setting of slidewire contacts 342a and 348a, but the movement of the band upwardly or downwardly, as the case may be, will be exponential with respect to the departure of the load from the mid-point of the band.

Assuming now that the load on turbine 10 is increasing at high rate, that increase produces a rapid change in the operation of wattmeter 22 to adjust the rheostat 320 correspondingly to increase the energization of the several heaters associated with the three branches of network 380. The resistance of resistor 359 rapidly increases, because not heat-lagged, with respect to the increase in resistance of resistor 346, which is heat-lagged. The current through the two branches, however, remains constant since the resistances of resistors 360 and 350 are decreased at the same rates as the resistances of resistors 359 and 346 are increased. With initial conditions such that the potential of contact 348a is higher than point 358 with respect to conductor 353, the effect of the foregoing is to increase the potential of the point 358 with respect to conductor 353. Since that potential is increasing at a greater rate than the potential of slidewire contact 348a with respect to conductor 353, the potential difference between point 358 and contact 348a is decreased. When the sense of the potential difference reverses, there is a 180° phase reversal of the voltage applied to detector 62, which thereupon operates to open limiting contacts 30. Though the potential difference between slidewire contact 342a with respect to conductor 353 has also been increasing, the connections are such that the detector 61 does not respond. Detector 61 will not respond until resistor 359 has its temperature reduced at greater rate than resistor 340. Such operation occurs when the load on turbine 10 is decreasing and wattmeter 22 is functioning to reduce the energization of the heaters associated with the respective resistors in the network. With decreased energization, the unlagged assembly 359—359a loses heat faster than the lagged assembly 340—340a. Accordingly, the potential difference between point 358 and conductor 353 decreases at a greater rate than between slidewire contact 342a and conductor 353. When point 358 has a lower potential than contact 342a with respect to conductor 353, the detector 61 operates to open the limiting contacts 33, the operation again corresponding with a 180° phase reversal.

Should the load be changing below the permissible or predetermined maximum rate, the wattmeter 22 will be adjusting the rheostat 320 for graduate change of current in each of the heater circuits. While the temperature change of resistor 346 will lag behind that of resistor 359, so long as the potential difference applied to detector 62 is not reduced to zero, the detector 62 will not be energized. Similarly, so long as the temperature of resistor 359 does not decrease at such a rapid rate as to reduce the potential difference applied to detector 61 to zero, it will not operate limiting contacts 33. Thus, for changes in load within the regulation band, the detectors will not introduce the limiting action, but as soon as a load change occurs which reaches or exceeds a limit of the band, the limiting action does occur. As soon as the limit of the regulation band has been attained, no further adjustment of the rheostat 320 occurs as a result of the operation of the load control system because of the opening of one or the other of the field circuits of motor 20. Accordingly, since the heating current for the heaters then remains constant, the heat-lagged resistor 346 (or 340) then begins to approach the temperature of resistor 359. As soon as it sufficiently approaches the same temperature, one or the other of detectors 61 and 62 is deenergized to reestablish operation within the regulation band.

Figure 7:
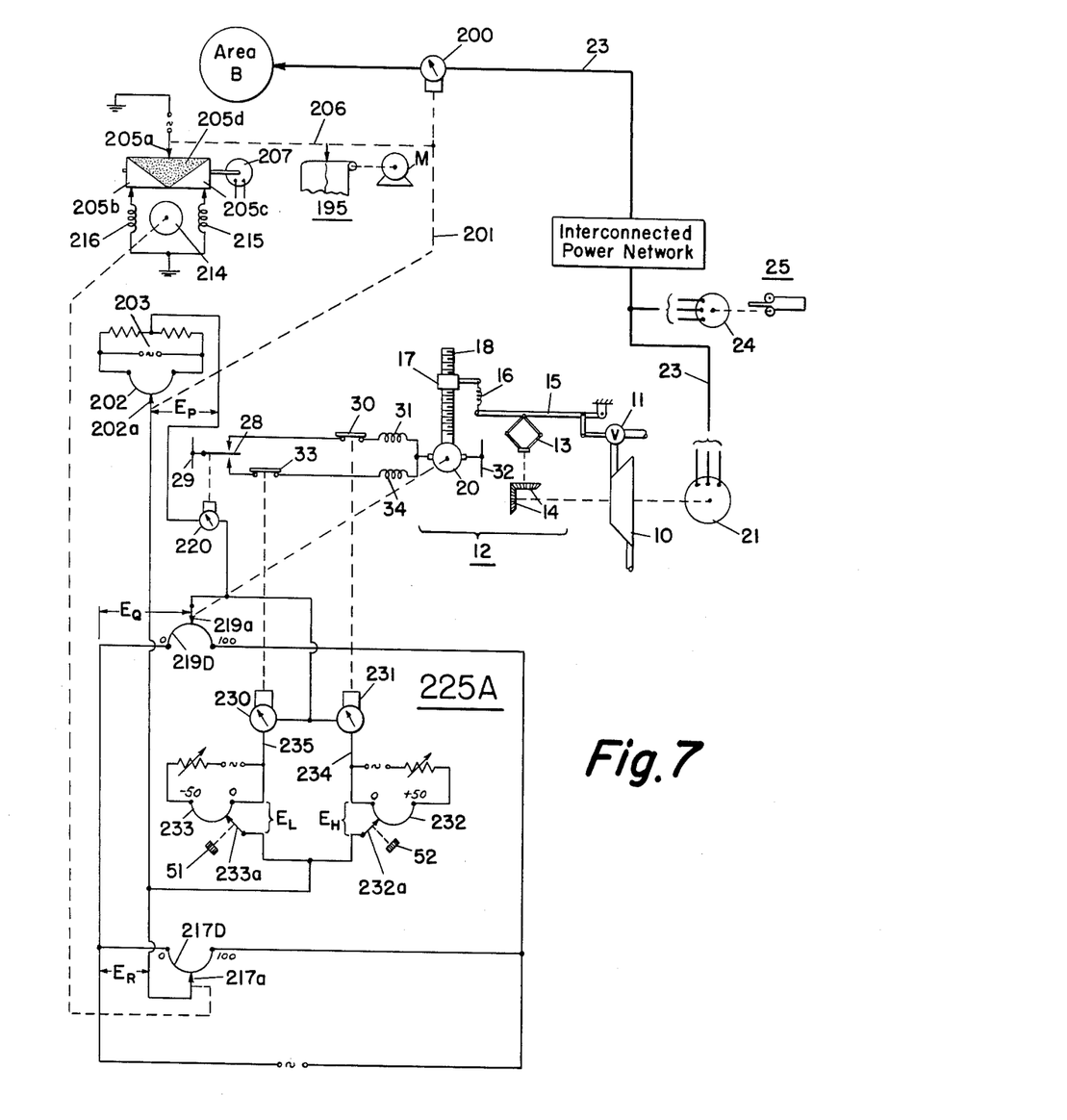
Fig. 7 is a modification embodying features of the system of Fig. 4.

The modification of Fig. 7 is in operation quite similar to the one illustrated in Fig. 4. However, in Fig. 7 the functions of networks 204 and 225 have been combined, only the network 225A being required in Fig. 7. The embodiment of Fig. 7 may be preferred to that of Fig. 4 by reason of the reduced number of components required without loss of functions and control purposes and also by avoidance of any requirement of having matched slidewires as between network 204 and network 225.

In Fig. 7 it will be seen that the detector 220 responds to any difference voltage developed in the series-circuit in which it is connected. If, for example, the load demand upon the turbine 10 is rising, the detector 200 will adjust slidewire contact 202a to develop a voltage $E_P$ in the series-circuit of magnitude corresponding to the increased load demand. The deviation of a system condition, the controlled variable, from the set point also produces through operation of detector 200 adjustment of contact 205a of the reset controller and energizes motor 214 for adjustment of contact 217a of network 225A and the voltage $E_R$ in accordance with the time integral of deviation of said controlled variable from the set point.

Also included in the series-circuit is a part of slidewire 219D whose contact 219a is adjusted by the load-controller motor 20, and it functions to introduce into that series-circuit the voltage $E_Q$. The similarity of reference characters indicates similarity of functions. This will be made clear by reference to Fig. 4 where it will be seen that slidewire contacts 219a and 58a are both adjusted by motor 20. Similarly, slidewire contacts 217a and 226a are both adjusted by the reset motor 214. In Fig. 7 slidewire 219D performs the functions of slidewires 58 and 219 of Fig. 4, and slidewire 217D of Fig. 7 performs the functions of slidewires 217 and 226 of Fig. 4.

Assuming now a rise in load demand, detector 200, through mechanical connection 201, adjusts slidewire contact 202a to change the magnitude of voltage $E_P$ in the series-circuit. Detector 220 in that circuit responds to energize motor 20 through raise winding 31 to increase the output of turbine 10 and of alternator 21. At the same time, detector 200 moves contact 205a to energize motor 214 in a direction to move slidewire contact 217a in a direction to change the voltage $E_R$ introduced into the network by an amount corresponding to the time integral of the deviation of the controlled variable from the set point. Upon energization of motor 20, it operates slidewire contact 219a in a direction to reduce the voltage difference or voltage unbalance of said series-circuit.

Load-limiting circuits including detectors 230 and 231 have voltages $E_L$ and $E_H$ of opposite sense developed therein by slidewires 233 and 232.

In referring to voltages of opposite sense, a generic description is intended to refer either to a direct-current source of supply for network 225A (as in Fig. 1), or to an alternating-current source as shown in Fig. 7. For direct current, the voltages $E_L$ and $E_H$ will be of opposite polarity. For alternating current, the voltages will be of opposite phase. Detectors 230 and 231 respectively respond to the difference between the voltages $E_L$ and $E_H$ developed in their circuits and the voltages $E_Q$ and $E_R$. When the difference between voltages $E_Q$ and $E_R$ is greater than voltage $E_L$ or $E_H$ detectors 230 or 231 will be energized depending upon whether voltage $E_R$ is greater than $E_Q$ or less than $E_Q$. Detectors 230 and 231 then operate load-limiting contacts 30 and 33. With the conditions already assumed, if the load demand tends to bring the output of turbine 10 above the upper limit of the regulation band, load-limiting contact 30 is opened in response to said phase reversal to reduce to a limited rate the extent of change of output of turbine 10.

The regulation band rises and falls with increase and decrease of load demand by reason of the adjustment of slidewire contact 217a. The width of the regulation band may be varied as desired by setter knobs 51 and 52, and in all respects the modification of Fig. 7 has the same flexibility as that of Fig. 4.

It is emphasized that the present invention comprehends balanceable electrical networks unbalanced in the several ways already described. Other types of balanceable systems will now suggest themselves including not only those of the potential balancing type but also those of the current-balancing type.

While several modifications of the invention have been explained, it is to be understood that they are to be taken as illustrative and that certain features of one may be incorporated into the other and that many different types of load-control systems will be suitable.

What is claimed is:

1. The combination with a load controller for a prime mover, of means establishing a regulation band having predetermined load limits spaced apart by a predetermined amount, means for shifting said band upwardly and downwardly respectively in response to increasing and decreasing load changes on said prime mover and at a predetermined rate, load control means for actuating said load controller to change the output of said prime mover without limit as to rate so long as said load is within said band, and means operable when said load control means tends to bring operation of said prime mover outside of said band for limiting the change of load on said prime mover to said predetermined rate.

2. The combination set forth in claim 1 in which means are provided for independently adjusting each of said load limits for increasing and decreasing the width of said band without affecting its upward and downward movement with increasing and decreasing load changes.

3. The combination with a load controller for a prime mover, of means establishing a regulation band having predetermined load limits spaced apart by a predetermined amount, means for shifting said band upwardly and downwardly respectively in response to increasing and decreasing load changes on said prime mover and at a predetermined low rate, load control means operable in response to load demand for actuating said load controller to adjust the output of said prime mover at a high rate so long as said load is within said band, means restricting operation of said load control means when the load demand tends to bring operation of said prime mover outside of said band for limiting the change of load on said prime mover to said predetermined rate, and means for adjusting said load limits to vary the load-spacing between them.

4. The combination with a load controller for a prime mover, of means including an electrical network having adjustable circuit components for establishing a regulation band having predetermined load limits spaced apart by a predetermined amount, means for varying potential differences in said network to shift said band upwardly and downwardly respectively in response to increasing and decreasing load changes on said prime mover and at a predetermined rate, load control means for actuating said load controller for adjustment of the output of said prime mover without limit as to rate so long as said load is within said band, and potential-sensitive means operable when said load control means and said load controller tend to bring operation of said prime mover outside of said band for limiting the change of load on said prime mover to said predetermined rate.

5. The combination with a load controller for a prime mover, of means establishing a load-regulation band having predetermined load limits spaced apart by a predetermined amount, means for concurrently varying said load limits upwardly and downwardly with increasing and decreasing changes of load on said prime mover as produced by said load controller, means selectively operable in response to the instantaneous load upon said prime mover relative to one or the other of said limits and operable whenever said instantaneous load tends to exceed one or the other of said limits for limiting respectively the upward and downward rates of load changes which may be produced upon said prime mover by said load controller so long as said instantaneous load tends to be outside of said band, said load controller being effective to produce maximum rates of change of load on said prime mover from any instantaneous value within said band to any other instantaneous value within said band.

6. The combination with a load controller operable in response to load demand to change at high rates the output of a prime mover, of a load limiting control system therefor comprising means establishing a regulation band having predetermined load limits spaced apart by a predetermined amount and within which said load controller may produce said high rates of change of output of said prime mover, means operable in response to change of output of said prime mover for indicating instantaneous values of output, means operable in response to change of output of said prime mover for concurrently moving said band upwardly and downwardly respectively with increase and decrease in output, and means operable whenever said load demand tends to make said instantaneous output exceed one or the other of said limits for limiting only in the same direction as said one or the other of said limits is exceeded the permissible rate of change of the output of said prime mover which may be produced by said load controller.

7. The combination with a load controller for a prime mover, of an electrical network having a plurality of branches for establishing a regulation band with predetermined load limits spaced apart by a predetermined amount and between which said load controller is effective to change the output of said prime mover at high rate, said network including circuit means for developing two voltages differing in potential by amounts corresponding to the load-separation of said limits, means for concurrently varying said voltages at limited rates upwardly and downwardly respectively with increasing and decreasing output of said prime mover to move said band with change of output of said prime mover, said network including circuit means for producing a reference voltage of magnitude representative of instantaneous values of output of said prime mover, and means responsive to a predetermined difference between said reference and comparison voltages for modifying the operation of said load controller to reduce to a predetermined rate permissible changes in output of said prime mover.

8. The combination with a load controller for a prime mover, of means establishing a load-regulation band having predetermined load limits which at a limited rate concurrently moves upwardly and downwardly respectively with increasing and decreasing load changes on said prime mover as produced by said controller comprising an electrical network having circuit components operable in response to load changes on said prime mover for varying reference voltages in accordance with said upward and downward movement of said band, means for varying a comparison voltage as a function of change of load on said prime mover produced by said controller, and means operable upon attainment of a predetermined difference between said comparison and reference voltages indicative of a load demand on said prime mover tending to bring its operation outside of said band for limiting the rate of change of load which may then be produced upon said prime mover by said load controller.

9. The combination with a load controller for a prime mover, of an output-limiting electrical network ineffective to modify the rate of change of output of said prime mover between upper and lower limits of an output-regulation band but which limits the rate of change of output of said prime mover in the direction in which its instantaneous output exceeds one or the other of said limits, comprising a pair of circuit components respectively developing reference voltages of instantaneously different magnitude and respectively representative of the upper and lower limits of said band, circuit means associated with said circuit components adjustable with change in output of said prime mover for simultaneously varying said reference voltages in the same direction and at limited rates, said network including a circuit component for developing a comparison voltage whose instantaneous value is representative of the instantaneous output of said prime mover, and means responsive to the difference between said comparison and said reference voltages for modifying the operation of said load controller to establish said limited rate of change of the output of said prime mover whenever said comparison voltage attains a value representative of an output at one or the other limits of said band.

10. The combination with a load controller for a prime mover, of means establishing a load-regulation band having predetermined load limits which with said band and at limited rates concurrently vary upwardly and downwardly respectively with increasing and decreasing load changes on said prime mover as produced by said controller comprising an electrical network having circuit components operable upon load changes on said prime mover for varying reference voltages in accordance with the upward and downward movement of said band, said network including a circuit branch having a circuit component for developing a comparison voltage whose instantaneous value is representative of the instantaneous output of said prime mover, and a pair of detectors, one responsive to the difference between said comparison voltage and one of said reference voltages for modifying the operation of said load controller to establish said limited rate of change of the output of said prime mover whenever said comparison voltage attains a value representative of an output at one limit of said band, and the other of said detectors being responsive to the difference between said comparison voltage and the other of said reference voltages for establishing a limited rate of change of output of said prime mover whenever said comparison voltage attains a value representative of an output at the other limit of said band.

11. The combination with a load controller for a prime mover, of an output-limiting electrical network ineffective to modify the rate of change of output of said prime mover between upper and lower limits of an output-regulation band but which limits the rate of change of output of said prime mover in the direction in which its instantaneous output tends to exceed one or the other of said limits, said network including one circuit branch having in series therein a pair of circuit components respectively developing reference voltages of instantaneously different magnitude and respectively representative of the upper and lower limits of said band, circuit means in said branch in series with said circuit components and adjustable with change in output of said prime mover for simultaneously varying said reference voltages in the same direction and at limited rates, said network including a second circuit branch having a circuit component for developing a comparison voltage whose instantaneous value is representative of the instantaneous output of said prime mover, and a pair of detectors, one responsive to the difference between said comparison voltage and one of said reference voltages for modifying the operation of said load controller to establish said limited rate of change of the output of said prime mover whenever said comparison voltage attains a value representative of an output at one limit of said band, and the other of said detectors being responsive to the difference between said comparison voltage and the other of said reference voltages for establishing a limited rate of change of output of said prime mover whenever said comparison voltage attains a value representative of an output at the other limit of said band.

12. The combination with a load controller for a prime mover, of an electrical network having a plurality of branches for establishing a regulation band with predetermined load limits spaced apart by a predetermined amount and between which said load controller is effective to change the output of said prime mover at high rate, said network including circuit means having separate sources of supply for developing two voltages differing in potential by amounts corresponding to the load separation of said limits, circuit components respectively connected in certain of said branches including said sources of supply for concurrently varying said voltages at limited rates upwardly and downwardly respectively with increasing and decreasing output of said prime mover to move said band with change of output of said prime mover, another of said branches of said network including an adjustable circuit component for producing a reference voltage of magnitude representative of instantaneous values of output of said prime mover, and detectors responsive to the difference between said reference voltage and respectively to said comparison voltages for modifying the operation of said load controller to reduce to a predetermined rate permissible changes in output of said prime mover when said differences attain predetermined values.

13. The combination with a load controller for varying the output of a prime mover to maintain a controlled variable at a predetermined value or set point, of means including a balanceable electrical network having adjustable circuit components connected in a comparison circuit thereof for developing unbalancing effects of magnitudes variable with adjustment of said components, means responsive to deviation of said controlled variable from said set point for adjusting one of said circuit components, means responsive to the time integral of deviation of said controlled variable from said set point for adjusting another of said circuit components, a detector connected to said comparison circuit and operable in one sense when the unbalance developed by one of said circuit components exceeds that developed by another of said components and operable in the opposite sense when said unbalance developed by said one circuit component is less than that produced by said other component, means for actuating said load controller in response to operation of said detector for adjusting the output of said prime mover in sense to maintain said controlled variable at said set point, means for adjusting a third one of said circuit components in response to actuation of said load controller for reducing the unbalance of said network, said network having means including a pair of load-limiting circuits having adjustable circuit components for developing oppositely acting biases in the respective load-limiting circuits, each load-limiting circuit including a detector responsive to the difference between its bias and a selected magnitude of system unbalance developed in said comparison circuit, one of said detectors responding to a system unbalance of said comparison circuit of one sense and the other of said detectors responding to a system unbalance of said comparison circuit of the opposite sense, and means operable by said load-limiting detectors for reducing the permissible rate of change of output of said prime mover which may be produced by said load controller.

14. The combination with a load controller for varying the output of a prime mover to maintain a controlled variable at a predetermined value or set point, of means including an electrical network having adjustable circuit components connected in a series-circuit for developing opposed voltages in that circuit, means responsive to deviation of said controlled variable from said set point for adjusting one of said circuit components, means responsive to the time integral of deviation of said controlled variable from said set point for adjusting another of said circuit components, a detector connected in said series-circuit and operable in one sense when the voltage developed by one of said circuit components exceeds the voltage developed by another of said circuit components and operable in the opposite sense when said one voltage is less than said other voltage, means for actuating said load controller in response to operation of said detector for adjusting the output of said prime mover in sense to maintain said controlled variable at said set point, means for adjusting a third one of said circuit components in response to actuation of said load controller for reducing the voltage difference applied to said detector, means including a pair of load-limiting circuits having adjustable circuit components for developing in the respective load-limiting circuits reference voltages of a predetermined magnitude and of opposite sense, each load-limiting circuit including a detector responsive to the difference between its reference voltage and a selected difference voltage developed in said series circuit, one of said detectors responding to a voltage difference in said series-circuit of one sense and the other of said detectors responding to a voltage difference in said series-circuit of the opposite sense, and means operable by said load-limiting detectors for reducing the permissible rate of change of output of said prime mover.

15. The combination with a load controller for varying the output of a prime mover to maintain a controlled variable at a predetermined value or set point, of means including an electrical network having adjustable circuit components connected in a comparison circuit for developing voltages of magnitudes variable with adjustment of said components, means responsive to deviation of said controlled variable from said set point for adjusting one of said circuit components, means responsive to the time integral of deviation of said controlled variable from said set point for adjusting another of said circuit components, a detector connected to said comparison circuit operable in one sense when the voltage developed by one of said circuit components exceeds that developed by another of said components and operable in the opposite sense when said one voltage is less than said other voltage, means for actuating said load controller in response to operation of said detector for adjusting the output of said prime mover in sense to maintain said controlled variable at said set point, means for adjusting a third one of said circuit components in response to actuation of said load controller for reducing the voltage difference applied to said detector, means including a pair of load-limiting circuits having adjustable circuit components for developing in the respective load-limiting circuits reference voltages of a predetermined magnitude and of opposite sense, each load-limiting circuit including a detector responsive to the difference between its reference voltage and a selected difference voltage developed in said comparison circuit, one of said detectors responding to a voltage difference of said comparison circuit of one sense and the other of said detectors responding to a voltage difference of said comparison circuit of the opposite sense, means operable by said load-limiting detectors for reducing the permissible rate of change of output of said prime mover, the adjustments of said components of said load-limiting circuits establishing a regulation band having a width related to the magnitudes of the respective voltages developed by said last-named components, and said component adjusted by said time integral of said deviation changing said band upwardly and downwardly at a limited rate as load demand upon said prime mover varies in corresponding directions.

References Cited in the file of this patent

UNITED STATES PATENTS

| | | |
|---|---|---|
| 1,984,920 | Doyle | Dec. 18, 1934 |
| 2,066,920 | Willby et al. | Jan. 5, 1937 |
| 2,485,374 | Farnham et al. | Oct. 18, 1949 |
| 2,558,729 | Buechler | July 3, 1951 |